United States Patent [19]

van der Lely

[11] 4,296,826

[45] Oct. 27, 1981

[54] VEHICLE HAVING BOGIE MOUNTED WHEELS

[76] Inventor: Cornelis van der Lely, 7, Brüschenrain, Zug, Switzerland

[21] Appl. No.: 32,030

[22] Filed: Apr. 20, 1979

[30] Foreign Application Priority Data

Apr. 26, 1978 [NL] Netherlands .................. 7804438

[51] Int. Cl.³ .......................................... B62D 61/10
[52] U.S. Cl. ..................................... 180/24; 180/21;
180/23; 180/24.01; 280/677
[58] Field of Search .................. 280/677; 180/21, 329,
180/22, 23, 24, 24.01, 24.02

[56] References Cited

U.S. PATENT DOCUMENTS

| | | | |
|---|---|---|---|
| 3,690,395 | 9/1972 | Spiller et al. | 180/53 R |
| 4,034,997 | 7/1977 | Oosterling et al. | 280/677 |
| 4,131,170 | 12/1978 | van der Lely | 180/329 |
| 4,153,265 | 5/1979 | McColl | 280/677 |

FOREIGN PATENT DOCUMENTS 820091  11/1951  Fed. Rep. of Germany ...... 280/676

Primary Examiner—Joseph F. Peters, Jr.
Assistant Examiner—Donn McGiehan
Attorney, Agent, or Firm—Penrose Lucas Albright

[57] ABSTRACT

A tractor which has three or four wheels on each side, two of the wheels on each side being mounted on a bogie which includes a wheel carrier. The bogie is pivotable relative to the rest of the vehicle about a horizontal transverse axle which connects it to the frame of the tractor. The foremost and rearmost wheels are steerable and driveable. In one embodiment, the intermediate wheels are also steerable and driveable. Lifting devices are provided to extend from both the forward and the rear of the tractor. An engine together with a transmission and differential gear is disposed between the foremost and the rearmost wheel axles. A cab has a driver's seat and steering wheel with a control console which may be rotated together whereby it selectively faces forwardly or to the rear. A cab in two embodiments is disposed forwardly and is centrally located in one embodiment. Two gear trains supported in a parallel relationship in the frame of the tractor are respectively connected to the differential's output shafts. The gear train may be connected to drive the wheels via shafts with universal joints and an outboard pinion which meshes with a gear mounted on each wheel disc. The construction allows all of the ground-engaging wheels to contact uneven ground whereby adequate support for the vehicle on soft ground is provided.

10 Claims, 7 Drawing Figures

VEHICLE HAVING BOGIE MOUNTED WHEELS

SUMMARY OF THE INVENTION HAVING BOGIE MOUNTED WHEELS

This invention relates to a vehicle having three or four ground-engaging wheels on each side. More particularly it relates to a tractor wherein at least two of the wheels on each side are mounted on a bogie which is pivotably mounted on a shaft extending from the tractor's frame.

According to a first aspect of the present invention there is provided a vehicle having on each side at least three ground wheels disposed one behind the other with respect to the direction of normal travel of the vehicle, at least two, but not all, of said wheels being mounted on a common bogie which is coupled with the rest of the vehicle for pivotal movement about a pivotal axis disposed between the axles of the wheels mounted on the bogie, one of said ground wheels being pivotable relatively to the rest of the vehicle about an upwardly extending steering axis. The foremost and rearmost wheels are both driveable by the vehicle's engine and are steerable. In one embodiment there are two intermediate wheels on each side which are also steerable. The vehicle is provided in at least one embodiment with two parallel longitudinally extending trains of gears for driving the wheels, each train being connected to the tractor's engine via a transmission and differential. In each embodiment, lifting devices are provided at both the forward and rear ends of the vehicle and the engine is disposed between the foremost and rearmost wheel axles.

For a better understanding of the present invention and to show how it may be carried into effect, reference will now be made, by way of example only, to the accompanying drawings in which:

DESCRIPTION OF THE PREFERRED EMBODIMENTS

Figure 1:
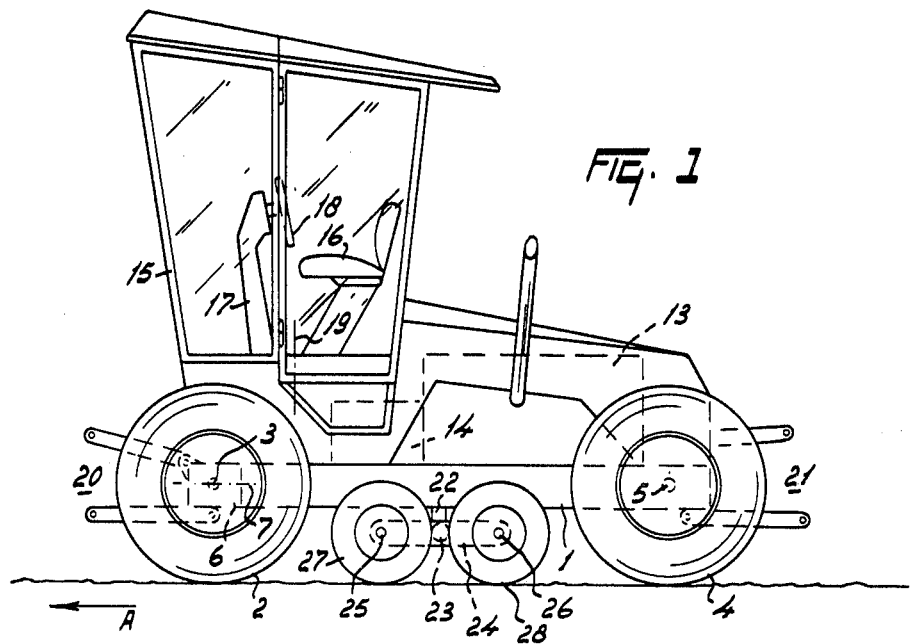
FIG. 1 is a side view of a tractor.

The tractor illustrated in FIG. 1 comprises a frame 1 supported by front wheels 2 which can rotate about axes 3 and by rear wheels 4 which can rotate about axes 5. The axes 3 are provided by a horizontal front axle member 6 which is transverse of the intended direction of forward travel A and is freely pivotable with respect to the frame 1 about a horizontal pivotal axis 7 lying in the vertical central longitudinal plane of the tractor. The axes 5 of the rear wheels 4 are provided by a horizontal rear axle member 8 which is transverse of the direction A and is rigidly secured to the frame 1 although it could be pivotable in the same manner as the axle member 6. The front wheels 2 and the rear wheels 4 are all steerable. For this purpose the front wheels 2 are pivotable about upwardly extending king pins 9 with respect to the front axle member 6, and the rear wheels 4 are pivotable about upwardly extending king pins 10 with respect to the rear axle member 8. The axes 3 of the front wheels 2 and the axes 5 of the rear wheels 4 are rigidly fixed with respect to track arms 11 and 12 respectively, which are pivotally connected to hydraulic steering cylinders which can be actuated by a driver of the tractor and are fastened to the front axle member 6 and to the frame 1 respectively.

The frame 1 supports a driving engine 13 in the region between the axes 3 and 5, in the part of that region nearer the rear axes 5. This engine 13 is connected to drive the front wheels 2 and the rear wheels 4 through a transmission 14. The transmission 14 comprises a clutch and a mechanical or hydrostatic torque converter. The transmission 14 is disposed in front of the engine 13.

Above the region between the axes 3 and 5 and nearer the axes 3 there is a driver's cab 15 at the front of the tractor. The lower side of the cab 15 is farther from the ground than the top point of the front wheels 2. The cab 15 contains a driver's seat 16 and a console 17 provided with a steering wheel 18 as well as with other steering and control members of the tractor. The seat 16 and the console 17 are fixed to one another and are rotatable together about a vertical axis 19 located between the seat 16 and the console 17. The assembly of the seat 16 and the console 17 can be turned about the axis 19 through 180° and be fixed in either of two positions, in one of which the driver faces forward and in the other of which he faces to the rear, with respect to the direction A. When the tractor is driven in the direction opposite to the direction A, the wheels 2 become the rear wheels. The transmission 14 is arranged in the space below the bottom of the cabin 15 and above the frame 1.

At both the front and the rear, the frame 1 has three-point hitching devices 20 and 21, which can be actuated from the driver's seat 16.

Beneath the frame 1, at a location approximately midway between the wheel axes 3 and 5, there is a downwardly extending support 22 rigidly fastened to each side of the frame 1. Near the lower end of each of the supports 22 is rigidly fastened a shaft 23 which projects in a direction perpendicular to the vertical, longitudinal central plane of the tractor. The two shafts 23 project sideways from the frame 1. On the outermost end of each shaft 23 is mounted a wheel carrier 24 which is freely pivotable about its shaft 23. Each wheel carrier 24 is substantially horizontal and is parallel to the central longitudinal plane of the tractor and its shaft 23 is located approximately midway along the length of the tractor.

Near each end of each wheel carrier 24 there is a wheel axle designated by reference numeral 25 forward, to the rear, which is perpendicular to the central, longitudinal plane of the tractor. The axles 25 and 26 are the same distance as each other from the shaft 23. The axle 25 has a wheel 27 of the tractor, and the axle 26 has a wheel 28. The wheels 27 and 28 are only a small distance from one another.

The assembly comprising the wheel carrier 24 and its two or more wheels is referred to from now on in this description as a bogie.

The front wheels 2 and the rear wheels 4 have the same diameter as each other. The diameters of the non-driven wheels 27 and 28 located between the wheels 2 and 4 are equal to one another, but smaller than the diameters of the wheels 2 and 4; preferably they are about one-half the diameter of the wheels 2 and 4. The bogie on each side of the tractor is pivotable about the centerline of its shaft 23 independently of the bogie on the other side of the tractor.

The construction described above allows the tractor, in operation and particularly when negotiating bends, to follow the ground surface, since the wheels 27 and 28 on each side of the tractor can assume positions required by the ground surface by pivoting of the bogie with respect to the frame 1. Furthermore the wheels 27 and 28 can effectively and evenly support some of the weight of the tractor so that wheel pressure of the steerable wheels can be reduced when travelling on weak soil. Not only do the front wheels 2 pivot about the axis 7, but the steered rear wheels 4 make sufficiently firm ground contact to absorb the lateral forces required for steering, since the wheels 27 and 28 turning about the shaft 23 hardly reduce the magnitude of the ground contact pressure applied by the rear wheels 4 and originating from the weight of a machine hitched to the lifting device 21. It is advantageous to dispose the wheels 27 and 28 at the smallest possible distance from one another.

Figure 3:
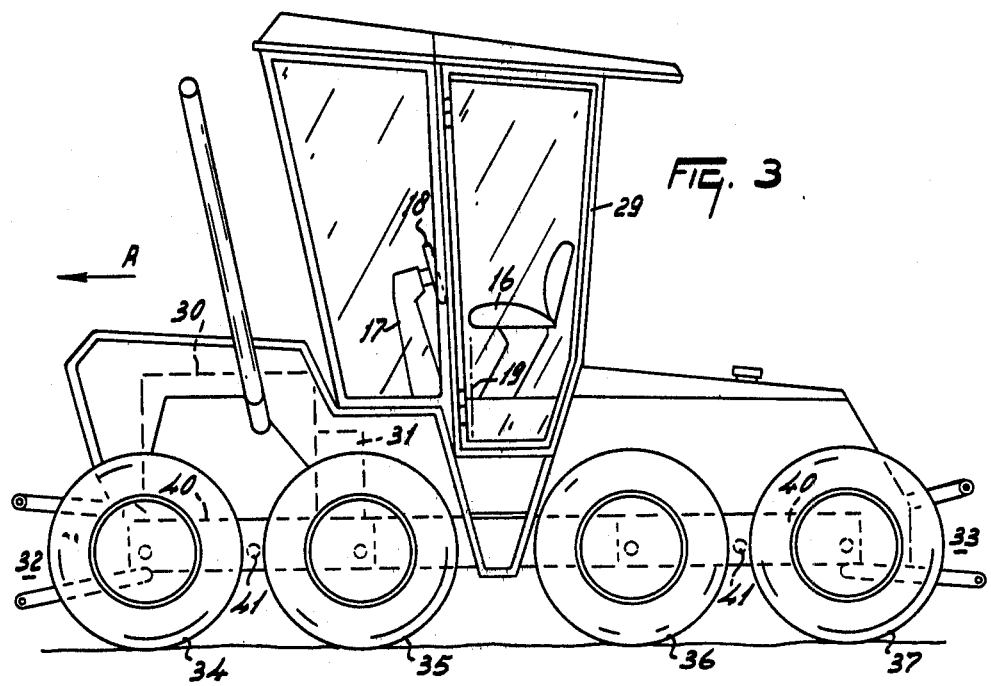
FIG. 3 is a side view of a second embodiment of a tractor.
Figure 4:
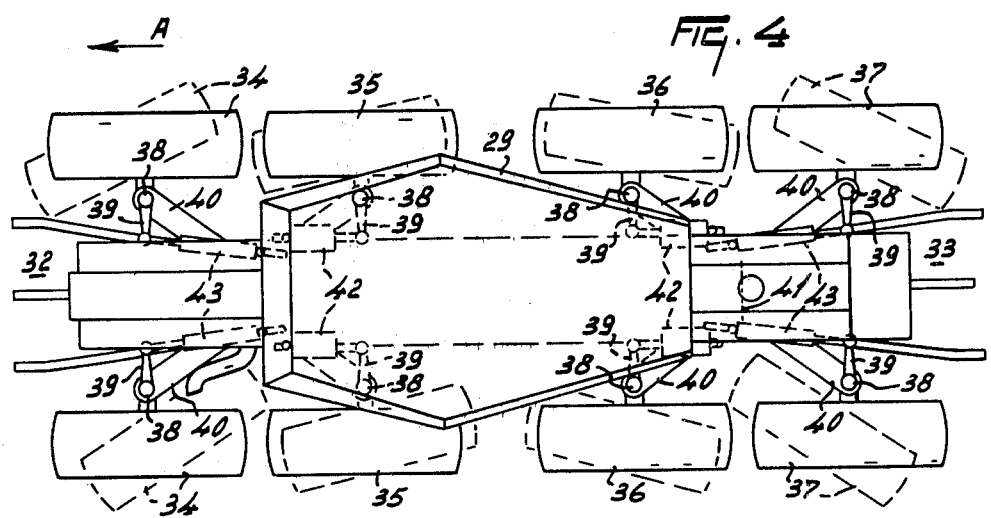
FIG. 4 is a plan view of the tractor shown in FIG. 3.

The tractor shown in FIGS. 3 and 4 comprises a driver's cab 29 disposed substantially midway along the length of the tractor. A driver's seat and steering and control members are provided, these being constructed and pivotally arranged in the same way as those in the first embodiment, and they are designated by the same reference numerals.

An engine 30 is arranged in front of the driver's cab 29 on the tractor frame and a transmission 31 comprising a clutch and hydraulic pump is disposed behind the engine and beneath the driver's cab. The tractor in this embodiment is particularly appropriate for working very large fields. In order to provide a large range without refuelling, almost the whole space above the frame and behind the cab 29 is available for fuel tanks. At both front and rear the frame is provided with hitching devices 32, 33 respectively, which can be actuated by the driver. The tractor has, in all, eight driven wheels, there being four wheels 34, 35, 36 and 37 arranged one behind the other on each side of the tractor. All of the wheels 34 to 37 are drivable by means of hydraulic wheel motors, which are powered by the hydraulic fluid pump provided in the transmission 31.

The leading wheels 34 and 35 and the trailing wheels 36 and 37 constitute two separate groups. Since the structure of the two groups are identical, only the trailing group comprising the wheels 36 and 37 will be described in detail. Each of the wheels 36 and 37 is pivotable about an upwardly extending king pin 38. The stub axle of each wheel has a rigidly secured track arm 39, which extends away from the king pin 38, about which the wheel is pivotable, in a direction away from the wheel. The king pin 38 of each wheel is fastened to a carrier 40 at a free end of the carrier 40. The carrier 40 extends away from the king pin 38 towards the vertical central longitudinal plane of the tractor. Viewed on plan, the four arms 40 of the wheels 36, 37 on the two sides of the tractor form a cross and are of equal lengths. These four arms 40, which extend substantially parallel to a horizontal plane, are rigidly secured to one another at or near the vertical central longitudinal plane of the tractor and are pivotable together about a common horizontal pivotal shaft 41 which is transverse of the vertical central longitudinal plane of the tractor. The angle between the two arms 40 on the same side of the tractor frame is about 100° to 120° in the embodiment shown, this angle being chosen so that the surface of each arm 40 facing the wheel mounted on it is substantially parallel to the vertical plane containing the inboard surface of the wheel when the wheel is at full lock in one direction. The crosswise interconnected arms 40 constitute together with the pivotal shaft 41 a bogie.

In a modification of the tractor shown in FIGS. 3 and 4, the arms 40 located on each side of the tractor are separate from those on the other side so that the arms of the two sides are independently pivotable. The wheels 36 and 37 on each side of the tractor are, therefore, pivotable together relatively to the wheels 36 and 37 on the other side about the pivotable shaft 41.

All of the wheels of the two-wheel or four-wheel bogies are steerable from the driver's seat 16. When negotiating a bend the four wheels visible in FIG. 3 should have mutually different deflections from the positions for straight-ahead travel, as is indicated in FIG. 4 by broken lines, since the axes of the wheels, on both sides of the tractor, should intersect at a single point. To achieve this, the two arms 40 of each of the two or four bogies located on the same side of the vertical central longitudinal plane of the tractor are provided with hydraulic cylinders 42 and 43. The piston rod of the cylinder 42 is coupled with the track arm 39 of the wheel 36 located nearer the center of the tractor, and the piston rod of the cylinder 43 is coupled with the track arm 39 of the rear most wheel 37. The bore of the cylinder 42 is greater than the bore of the cylinder 43. The stroke of the piston of the cylinder 42 is smaller than the stroke of the piston of the cylinder 43, the ratio of the strokes being equal to the ratio of the sectional areas of the cylinder bores. On the other side of the vertical central longitudinal plane of the tractor there is a similar set of hydraulic cylinders 42 and 43. Each bogie for the wheels 34 and 35 is provided in a similar manner with four hydraulic cylinders identical to the cylinders 42 and 43. The hydraulic pump of the transmission 31 feeds all of the hydraulic cylinders 42, 43 by way of a control valve which can be actuated by the driver.

The piston rods of the pistons in the hydraulic cylinders 42 and 43 preferably have ducts emerging from both ends of their cylinders, one end of each piston rod being connected with the associated track arm 39. During negotiation of a left-hand or a right-hand bend the working chamber on one side of the piston in the cylinder 42 is connected by the control valve with the hydraulic pump. The working chamber on the other side of this piston communicates through a hydraulic duct with the working chamber on one side of the piston in the cylinder 43, and the working chamber on the other side of the piston in the cylinder 43 is connected by the control valve with a reservoir. During negotiation of a bend in the other direction the situation is the reverse.

With the arrangement described, the volume of fluid displaced in the cylinder 42 is equal to the volume of fluid displaced in the cylinder 43. Since the sectional area of the bore of the cylinder 42 is larger than the sectional area of the bore of the cylinder 43, the displacement of the piston in the cylinder 42 is smaller than the displacement of the piston in the cylinder 43, as a result of which the deflection of the wheel 36 during a bend is smaller than that of the wheel 37. It follows that the maximum stroke of the piston in the cylinder 43 is proportionally larger than the maximum stroke of the piston in the cylinder 42. This control arrangement is provided on both sides of the longitudinal central plane of the tractor and on all of the bogies. The volume of fluid supplied per unit time to the cylinders 42 and 43 located on the outer side of the bend exceeds the volume of fluid supplied to those on the inner side of the bend. This effect varies with the deflection of the wheel 18 and is achieved by the control valve, but as an alternative it could be achieved by means of a conventional mechanical coupling between the track arms 39 of two wheels mounted on the same bogie and located directly opposite one another on the two sides of the tractor frame. All of the steerable wheels are controlled by the steering wheel 18.

Figure 2:
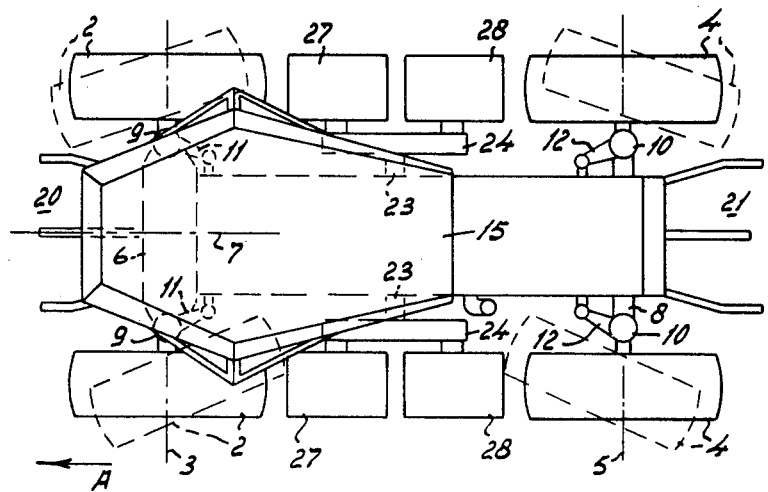
FIG. 2 is a plan view of the tractor shown in FIG. 1.

In this embodiment the steerable wheels are themselves mounted on bogies, while the same advantages are obtained as in the embodiment of FIGS. 1 and 2. During negotiation of a bend, all of the wheels can remain in contact with the ground so that maximum ground contact pressure and driving force are exerted by each of the steered and driven wheels. This is, of course, particularly important if the tractor shown in FIGS. 3 and 4 is to make bends of very small radius. The weight of machines carried by the hitching devices 32 and 33 is distributed in an optimum manner along all wheels of each bogie, since this weight is transferred to the wheels through the pivotal shaft 41 located centrally between the wheels of each bogie.

Figure 5:
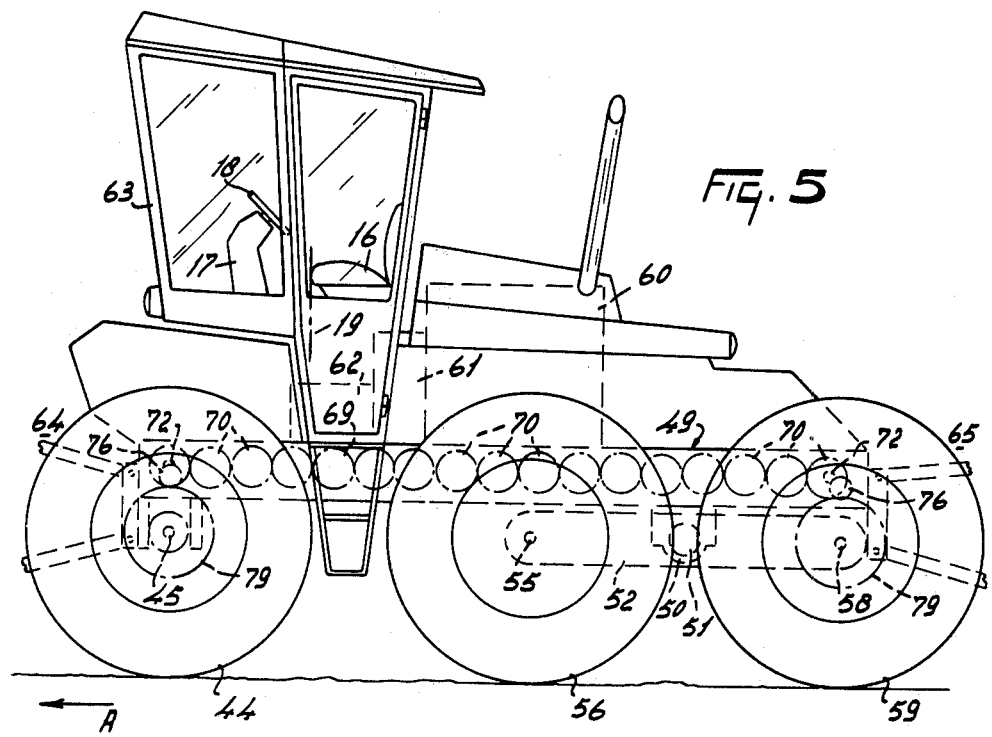
FIG. 5 is a side view of a third embodiment of a tractor.
Figure 6:
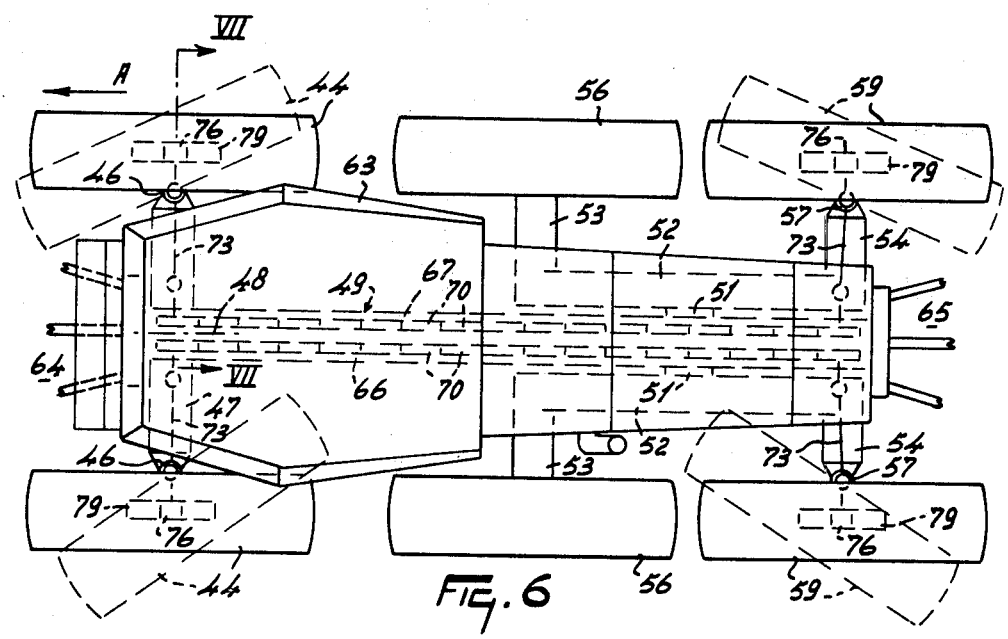
FIG. 6 is a plan view of the tractor shown in FIG. 5.
Figure 7:
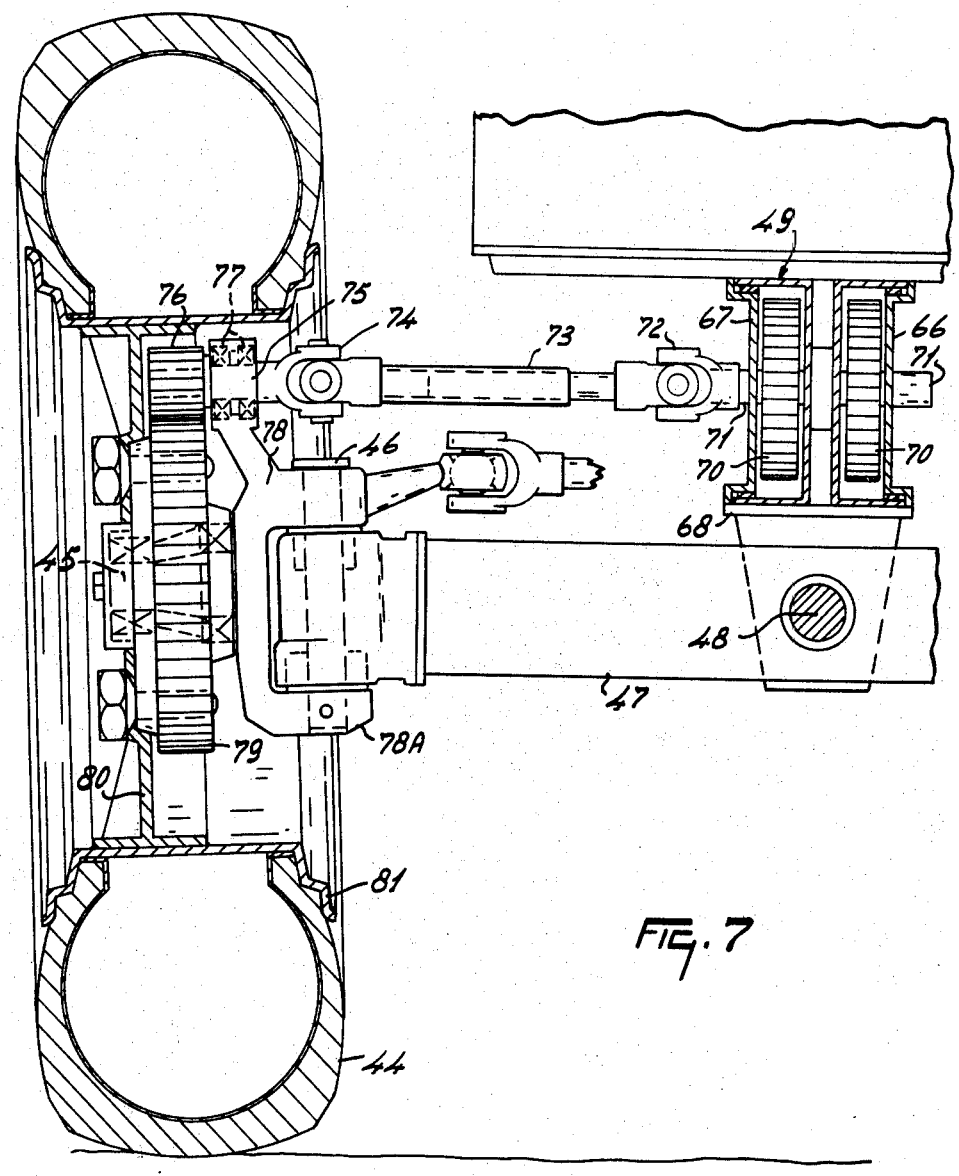
FIG. 7 is a sectional view taken on the lines VII—VII in FIG. 6.

The tractor illustrated in FIGS. 5, 6 and 7 has on each side of its frame, three wheels arranged one behind the other with respect to the direction of normal forward travel A. This tractor has front wheels 44, the wheel axles 45 of which are pivotable about upwardly extending king pins 46 and are fastened to a substantially horizontal front axle member 47 extending transversely of the direction A. The front axle member 47 is pivotable relatively to the frame about a horizontal pivotal shaft 48, which is located in the vertical central longitudinal plane of the tractor. The front axle member 47 is provided with a hydraulic cylinder for steering the front wheels 44.

A frame member 49 of the tractor is arranged symmetrically to the vertical central longitudinal plane of the tractor. It is narrow compared with the overall width of the tractor, its width being 9 to 14% of the overall width of the tractor.

At a position in front of the rear end of the frame member 49, a support 50 is fastened to the bottom of the frame member. This support 50 carries a shaft 51, which extends horizontally and perpendicular to the vertical central longitudinal plane of the tractor. The shaft 51 projects to both sides beyond the frame member 49. A carrier beam comprising a wheel carrier 52 is mounted freely pivotably about each of the two ends of the shaft 51 projecting beyond the frame member 49. The wheel carriers 52 extend parallel to the frame member 49. The pivotal connection of each wheel carrier 52 with its shaft 51 is midway along the length of the wheel carrier 52. Each wheel carrier 52 is provided at each end with a support 53 forward, and 54, to the rear, respectively, each of which extends perpendicular to the vertical central longitudinal plane of the tractor. The leading support 53, with respect to the direction A, is provided at its outer end with a wheel axle 55, on which a leading rear wheel 56 is freely rotatable. The trailing support 54 is provided at its outer end with an upwardly extending king pin 57, on which a wheel axle 58 is pivotable. A trailing rear wheel 59 is rotatably journalled on the wheel axle 58. The trailing rear wheels 59 are steerable in a similar manner to the front wheels 44 by means of a hydraulic steering cylinder (not shown) fastened to the associated support 54. The intermediate, leading rear wheels 56 are not steerable and are not drivable. The wheels 44, 56, 59 all have the same diameter. The wheel carrier 52 on each side of the vertical central longitudinal plane of the tractor, together with the supports 53 and 54 rigidly secured thereto and the shaft 51 constitutes a bogie. The bogies on the two sides of the tractors, which together comprise a cradle frame part, are pivotable independently of one another about the centerline of the shaft 51 with respect to the frame member 49.

At about the same level along the length of the tractor as the leading rear wheel 56, there a driving engine 60 of the tractor which is mounted on the frame member 49. A transmission 61 is disposed in front of, and coupled with, the engine 60. This transmission comprises a driver-actuable clutch and a torque converter. In front of the transmission 61 there is a differential gear 62 which is driven by the torque converter. The transmission 61 and the differential gear 62 are disposed beneath a driver's cab 63 at the front of the tractor at the level of the front wheels 44 and above the space between the wheels 44 and 56. The cab 63, as before, comprises a driver's seat 16 and a console 17 provided with a steering wheel 18 and other steering control members of the tractor. The assembly of the seat 16 and the console 17 is again pivotable and fixable in either of two positions about the vertial pivotal axis 19 located between the console and the seat as in the embodiment of FIGS. 1 and 2. When travelling in the direction opposite the direction A, the wheels 44, constitute driven, steerable wheels of the tractor.

At both front and rear, the tractor frame has three-point hitching devices 64 and 65, which can be actuated from the driver's seat 16.

The frame member 49, which extends from ahead of the front axle 45 to behind the rear axle 58, is assembled from two hollow beams 66 and 67 arranged side by side with a short gap between them, one on each side of the central vertical plane of the tractor. The height of each of these hollow beams is a few times larger than the width thereof. The bottom surfaces of both of the hollow beams are rigidly secured to a comparatively rigid carrying plate 68 (FIG. 7) covering the whole width of the frame member 49.

The bottom of the differential gear 62 is fastened to the top surfaces of the two hollow beams 66 and 67. The two output shafts of the differential gear 62 drive pinions (not shown) are arranged side by side with a gap between them, the rotary axes of these pinions being perpendicular to the central vertical plane of the tractor. Each of these two pinions is in mesh with a pinion 69 which has straight teeth and is housed in a respective one of the hollow beams 66 and 67 (FIG. 5). The axes of these pinions 69 coincide and are perpendicular to the central vertical plane of the tractor. The pinions 69 are journalled separately in the respective hollow beams 66 or 67. The pinions 69 each mesh with spur pinions 70, which are disposed in front of and behind the pinion 69. All of the pinions 70 have the same diameters and are rotatable about shafts accommodated in the hollow beams 66 and 67 respectively, these shafts being parallel to the rotary shaft of the associated pinion 69. The rotary axes of the pinion 69 and 70 lie in a horizontal planne perpendicular to the central vertical plane of the tractor. Each of the hollow beams 66 and 67 thus has a separate gear train comprising the pinions 69, 70 and, owing to the differential drive, the speed of the pinions in the hollow beam 66 may differ from the speed of the pinions in the hollow beam 67. The pitch circles of all of the pinions 69, 70 are the same.

The leading pinion 70 in the hollow beam 67 drives the front wheel 44 located on the right-hand side of the tractor, viewed in the direction of travel A, and the leading pinion 70 in the hollow beam 66 drives the other front wheel 44. Similarly, the trailing pinion 70 in the hollow beam 67 drives the trailing rear wheel 59 located on the right-hand side of the tractor, and the trailing pinion 70 in the hollow beam 66 drives the other rear wheel 59. FIG. 7 illustrates the drive of the right-hand front wheel 44. The drive of the other wheels 44 and 59 is performed in a similar manner.

The rotary shaft of the leading pinion 70 in the hollow beam 66 is extended to the outside of the beam as a shaft 71 (FIG. 7). To the outermost end of the shaft 71 is fastened one member of a universal joint 72, by means of which a telescopic shaft 73 can be driven, this shaft being located substantially over the wheel axle 45. The end of the shaft 73 away from the univeral joint 72 is drivably connected by means of a second universal joint 74 with a shaft 75, which may form part of the joint 74. The shaft 75 is integral with a spur pinion 76, the central vertical plane of which substantially coincides with the central vertical plane of the wheel 44. The shaft 75 of the pinion 76 is journalled in one or more bearings 77, the outer races of which are supported by an extension 78 of a rigid fork 78A, this extension being inclined inwardly from top to bottom away from the bearings 77. The fork piece 78A is rigidly secured to the wheel axle 45 and supports the wheel 44 pivotably on the king pin 46. The pinion 76 meshes with a pinion 79, which is rotatable about the end of the wheel axle 45. To the outboard side of the pinion 79 is secured a wheel disc 80, the periphery of which is provided with a rim 81 of the wheel 44.

In operation, the two gear trains located in the two hollow beams 66 and 67 are driven through the differential gear 62 and the transmission 61 by the engine 60, the differential gear providing, as is conventional, different speeds of rotation of the wheels during negotiation of bends. The leading and trailing pinions 70 in the hollow beams 66 and 67 drive the shafts 75 and hence the pinions 76 through the shafts 71 and the telescopic shafts 73. The diameter of the pitch circle of each pinion 76 is substantially 15 to 25% of the diameter of the pitch circle of the pinion 79. The torque transmitted by the telescopic shaft 73 is, therefore, appreciably lower than the torque applied by the wheels 44, 59.

As in the previous embodiments, all of the wheels located on one side of the tractor can follow the ground surface, since the front wheels 44 are pivotable about the wheel axle 48, and the wheels 56 and 59 of each bogie are pivotable together about the centerline of the shaft 51. The weights of machines attached to the lifting devices 64 and 65 are distributed over all of the wheels, while the load on each set of rear wheels 56 and 59 is applied at the shaft 51 located centrally between the wheels. Moreover, during negotiation of bends, sufficient ground pressure is applied to the steered and driven rear wheels 59 of the tandem carriage to exert the required lateral forces, even with tractors for which at least three wheels on each side of the tractor are required for travelling on weak soil in order to avoid sinking into the ground; this is true also for the preceding embodiments. In all embodiments all wheels located on one side of the tractor may be replaced by a double set of wheels. Furthermore, in all embodiments, the distance between the axes of a bogie is smaller than the sum of the diameters of two wheels which are part of the bogie and disposed one behind the other.

Although various features of the vehicles described and illustrated in the drawings will be set forth in the following claims as inventive features, it is to be understood that the invention is not necessarily limited to these features and may encompass all features that have been described both individually and in various combinations.

Having described my invention, what I claim as new and desire to secure by Letters Patent of the United States is:

1. An agricultural tractor comprising a frame, an engine carried by said frame, a tractor hitching device mounted on the rear of said frame, at least three ground engaging wheels mounted on each side of said frame, said ground engaging wheels on each side being aligned one behind the other with respect to the tractor's direction of travel, a cradle frame part, said cradle frame part comprising two carrier beams which are effectively parallel to the tractor's plane of symmetry, at least two but not all of said aligned wheels on each side of said frame mounted on a corresponding said carrier beam of said cradle frame part, each said carrier beam being independently pivotable relative to said tractor frame about a substantially fixed axis extending normally relative to the tractor's plane of symmetry and between the axes of rotation of said two wheels which are mounted on each said carrier beam, steerable wheels mounted at the front of said frame forward of said cradle frame part, said steerable wheels being pivotable relative to said frame about at least one horizontal axis substantially directed parallel to the tractor's plane of symmetry, drive means connecting said front steerable wheels and the rear wheels mounted on said cradle frame part whereby such wheels are driven by said engine, and steering means for said tractor connected to said steerable wheels and only the rearmost wheels of said wheels mounted on each side of said cradle frame part.

2. An agricultural tractor in accordance with claim 1 wherein the tractor's rearmost wheels are mounted on said cradle frame part.

3. A tractor in accordance with claim 2 wherein all of the tractor's wheels have the same diameter.

4. A tractor in accordance with claim 1 wherein only three of said ground engaging wheels are mounted on each side of said frame, the middle wheel of said ground engaging wheels on each side having its axis of rotation nearer to the axis of rotation of said rearmost wheels than the axis of rotation of said steerable front wheels.

5. A tractor in accordance with claim 4 wherein said engine is mounted only over said middle wheels.

6. A tractor in accordance with claim 5 wherein the tractor's controls and operator's seat are in a cabin mounted on said frame forward of said engine.

7. A tractor in accordance with claim 6 wherein said controls and said seat comprise an assembly which can be turned about a vertical axis of 180° and fixed in either of two positions, one of said positions in which the operator faces forward and the other of said positions in which the operator faces to the rear.

8. A tractor in accordance with claim 7 wherein said vertical axis is substantially tangential to said steerable front wheels as seen from the side.

9. A tractor in accordance with claim 8 wherein a further tractor hitching device is mounted on the front of said frame.

10. A tractor in accordance with claim 1 wherein one further wheel is arranged on each side of the tractor on the rearmost of said wheel axles of said cradle frame part.

* * * * *